(12) United States Patent
Daley

(10) Patent No.: US 7,570,584 B1
(45) Date of Patent: Aug. 4, 2009

(54) NETWORK-WIDE CONGESTION CONTROL OF SPVC SIGNALING MESSAGES

(75) Inventor: Patrick D. Daley, Portola Valley, CA (US)

(73) Assignee: Cisco Technology, Inc., San Jose, CA (US)

( * ) Notice: Subject to any disclaimer, the term of this patent is extended or adjusted under 35 U.S.C. 154(b) by 925 days.

(21) Appl. No.: 10/112,452

(22) Filed: Mar. 29, 2002

(51) Int. Cl.
  *H04J 1/16* (2006.01)
(52) U.S. Cl. .................. 370/229; 370/232; 370/235
(58) Field of Classification Search ............ 370/229, 370/231, 235, 236, 236.1, 236.2, 237, 242, 370/244, 247–249, 395.2, 395.32, 395.31, 370/389
  See application file for complete search history.

(56) References Cited

U.S. PATENT DOCUMENTS

| | | | |
|---|---|---|---|
| 3,988,545 A | 10/1976 | Kuemmerle et al. |
| 4,238,851 A | 12/1980 | Takahashi et al. |
| 4,475,192 A | 10/1984 | Fernow et al. |
| 4,491,945 A | 1/1985 | Turner |
| 4,494,230 A | 1/1985 | Turner |
| 4,499,576 A | 2/1985 | Fraser |
| 4,506,358 A | 3/1985 | Montgomery |
| 4,561,090 A | 12/1985 | Turner |
| 4,626,624 A | 12/1986 | Daisenberger |
| 4,644,533 A | 2/1987 | Braff et al. |
| 4,654,654 A | 3/1987 | Butler et al. |
| 4,679,190 A | 7/1987 | Dias et al. |
| 4,703,475 A | 10/1987 | Dretzka et al. |
| 4,703,477 A | 10/1987 | Adelmann et al. |
| 4,757,529 A | 7/1988 | Glapa et al. |
| 4,771,424 A | 9/1988 | Suzuki et al. |
| 4,771,425 A | 9/1988 | Baran et al. |
| 4,819,228 A | 4/1989 | Baran et al. |
| 4,819,230 A | 4/1989 | Calvignac et al. |
| 4,839,891 A | 6/1989 | Kobayashi et al. |
| 4,894,824 A | 1/1990 | Hemmady et al. |
| 4,903,261 A | 2/1990 | Baran et al. |
| 4,905,233 A | 2/1990 | Cain et al. |
| 4,914,650 A | 4/1990 | Sriram |

(Continued)

FOREIGN PATENT DOCUMENTS

EP  0374928  6/1990

(Continued)

OTHER PUBLICATIONS

Rice, Liz, "Soft PVCS in an ATM Network: Analysis of the Benefits of Using Soft PVCs, Including the Use of a Proprietary Solution for Protection-switched SPVCs", Jan. 23, 2001, 11 pages.

(Continued)

*Primary Examiner*—Brenda Pham
(74) *Attorney, Agent, or Firm*—Schwegman, Lundberg & Woessner, P.A.

(57) ABSTRACT

A system and method are described for a semi-permanent virtual circuit (SPVC) manager to manage a network of switches coupled together to form a semi-permanent virtual circuit. The SPVC manager considers connection resources internal to the network throughout the network when managing the SPVC. The SPVC manager uses either a static flow control window or a dynamically sized flow control window to manage pending connections within the network.

72 Claims, 4 Drawing Sheets

U.S. PATENT DOCUMENTS

| | | | |
|---|---|---|---|
| 4,939,718 | A | 7/1990 | Servel et al. |
| 4,974,224 | A | 11/1990 | Boone |
| 5,020,058 | A | 5/1991 | Holden et al. |
| 5,062,106 | A | 10/1991 | Yamazaki et al. |
| 5,067,074 | A | 11/1991 | Farel et al. |
| 5,072,449 | A | 12/1991 | Enns et al. |
| 5,088,032 | A | 2/1992 | Bosack |
| 5,090,011 | A | 2/1992 | Fukuta et al. |
| 5,115,431 | A | 5/1992 | Williams et al. |
| 5,119,367 | A | 6/1992 | Kawakatsu et al. |
| 5,128,932 | A | 7/1992 | Li |
| 5,130,978 | A | 7/1992 | Mobasser |
| 5,140,584 | A | 8/1992 | Suzuki |
| 5,267,232 | A | 11/1993 | Katsube et al. |
| 5,278,830 | A | 1/1994 | Kudo |
| 5,280,483 | A | 1/1994 | Kamoi et al. |
| 5,295,183 | A | 3/1994 | Langlois et al. |
| 5,313,454 | A | 5/1994 | Bustini et al. |
| 5,349,579 | A | 9/1994 | Madonna et al. |
| 5,359,592 | A | 10/1994 | Corballis et al. |
| 5,377,327 | A | 12/1994 | Jain et al. |
| 5,473,604 | A | 12/1995 | Lorenz et al. |
| 5,519,690 | A | 5/1996 | Suzuka et al. |
| 5,548,533 | A | 8/1996 | Gao et al. |
| 5,590,118 | A | 12/1996 | Nederlof |
| 5,600,798 | A | 2/1997 | Cherukuri et al. |
| 5,703,870 | A | 12/1997 | Murase |
| 5,751,969 | A | 5/1998 | Kapoor |
| 5,831,973 | A | 11/1998 | Yokotani et al. |
| 5,835,484 | A | 11/1998 | Yamato et al. |
| 5,898,691 | A | 4/1999 | Liu |
| 5,912,879 | A | 6/1999 | Cha et al. |
| 5,970,048 | A | 10/1999 | Pajuvirta et al. |
| 6,018,519 | A | 1/2000 | Ginzboorg |
| 6,032,188 | A | 2/2000 | Mairs et al. |
| 6,169,727 | B1 | 1/2001 | Song |
| 6,192,422 | B1 | 2/2001 | Daines et al. |
| 6,201,810 | B1 | 3/2001 | Masuda et al. |
| 6,275,493 | B1 | 8/2001 | Morris et al. |
| 6,282,197 | B1 | 8/2001 | Takahashi et al. |
| 6,304,549 | B1 * | 10/2001 | Srinivasan et al. ......... 370/230 |
| 6,356,629 | B1 | 3/2002 | Fourie et al. |
| 6,366,582 | B1 | 4/2002 | Nishikado et al. |
| 6,424,620 | B1 | 7/2002 | Nishihara |
| 6,434,152 | B1 | 8/2002 | Yamamura |
| 6,442,140 | B1 | 8/2002 | Kirschenbaum |
| 6,456,600 | B1 | 9/2002 | Rochberger et al. |
| 6,463,476 | B1 | 10/2002 | Milles |
| 6,477,143 | B1 | 11/2002 | Ginossar |
| 6,560,654 | B1 | 5/2003 | Fedyk et al. |
| 6,563,809 | B1 | 5/2003 | Proctor, Jr. et al. |
| 6,563,835 | B1 | 5/2003 | Chen |
| 6,614,762 | B1 | 9/2003 | Illiadis et al. |
| 6,625,121 | B1 | 9/2003 | Lau et al. |
| 6,690,653 | B1 | 2/2004 | Anbiah et al. |
| 6,725,378 | B1 | 4/2004 | Schuba et al. |
| 6,967,924 | B1 | 11/2005 | Aimoto |
| 2002/0080721 | A1 * | 6/2002 | Tobagi et al. ............ 370/236 |
| 2004/0071086 | A1 * | 4/2004 | Haumont et al. ............ 370/230 |
| 2005/0060400 | A1 * | 3/2005 | Mannepalli et al. ......... 709/223 |

FOREIGN PATENT DOCUMENTS

| | | |
|---|---|---|
| EP | 0444395 A2 | 9/1991 |
| WO | WO 93/01670 A1 | 1/1993 |
| WO | WO 93/19551 | 9/1993 |
| WO | WO 93/20637 A1 | 10/1993 |
| WO | WO 95/01076 | 1/1995 |
| WO | WO 00/47011 A1 | 8/2000 |

OTHER PUBLICATIONS

SPVC Manager Architecture, 1 page (date prior to Mar. 29, 2002).

DC-SPVC, 3 pages (Oct. 22, 2001).

Partho P. Mishra and Satish K. Tripathi: "Dynamic Bandwidth Allocation in High Speed Integrated Service Networks," IEEE INFOCOM '93, pp. 1298-1305 (Mar. 28, 1993).

Osama Aaboul-Magd, et. al.: "Flow and Congestion Control for Broadband Packet Networks," Teletraffic and Datatraffic in a Period of Change, ITC-13, Copenhagen, Denmark, pp. 853-858 (Jun. 19-26, 1991).

K.K. Ramakrishnan and Raj Jain, "A Binary Feedback Scheme for Congestion Avoidance in Computer Networks," ACM Transactions on Computer Systems, vol. 8, No. 2, pp. 158-181 (May 1990).

Alexander Gersht and Kyoo J. Lee, "A Congestion Control Framework for ATM Networks," IEEE Journal on Selected Areas in Communications, vol. 9, No. 7, pp. 1119-1130 (Sep. 9, 1991).

Raj Jain and K.K. Ramakrishnan, "Congestion Avoidance in Computer Networks with a Connectionless Network Layer: Concepts, Goals and Methodology," Computer Networking Symposium, pp. 134-143 (Apr. 1988).

K.W. Fendick, D. Mitra, I. Mitrani, M.A. Rodrigues, J.B. Seery, and A. Weiss: "An Approach to High Performance, High-Speed Data Networks," IEEE Communications Magazine, pp. 74-82 (Oct. 1991).

IPX System Operation Guide, StrataCom, Inc., pp. 2-1 through 2-18 (1988).

Mito, M. et al; "B-ISDN Signalling Protocol Processing for Large Multiplexed Subscriber System," 1995 IEEE International Conference on Communications. Converging Technologies for Tomorrow's Applications. ICC '96. Proceedings of ICC/SUPERCOMM '96-International Conference on Communications, Dallas, TX, USA, pp. 663-668 vol. 2, XP002140624 1996.

C. Anthony Cooper and Kun I. Park, "Toward A Broadband Congestion Control Strategy," IEEE Network Magazine, pp. 18-23 (May 1990).

K. Bala, I. Cidon, and K. Sohraby, "Congestion Control for High Speed Packet Switched Networks," IEEE, pp. 520-526 (1990).

The IPX Product Family System Description, StrataCom, Inc., pp. 1-114 (1990).

International Search Report mailed Jul. 4, 2000 in counterpart PCT Application No. PCT/US00/02604 (3 pages).

International Search Report from European Patent Office PCT/US 93/02097 (mailed Sep. 23, 1993) (3 pages).

PCT International Search Report PCT/US 94/04648 (mailed Oct. 28, 1994) (3 pages).

U.S. Patent Application entitled "Managing Network Congestion Using Dynamically Advertised Congestion Status," U.S. Appl. No. 09/491,991, filed Jan. 26, 2000, Inventors(s): Dean Cheng et al.

* cited by examiner

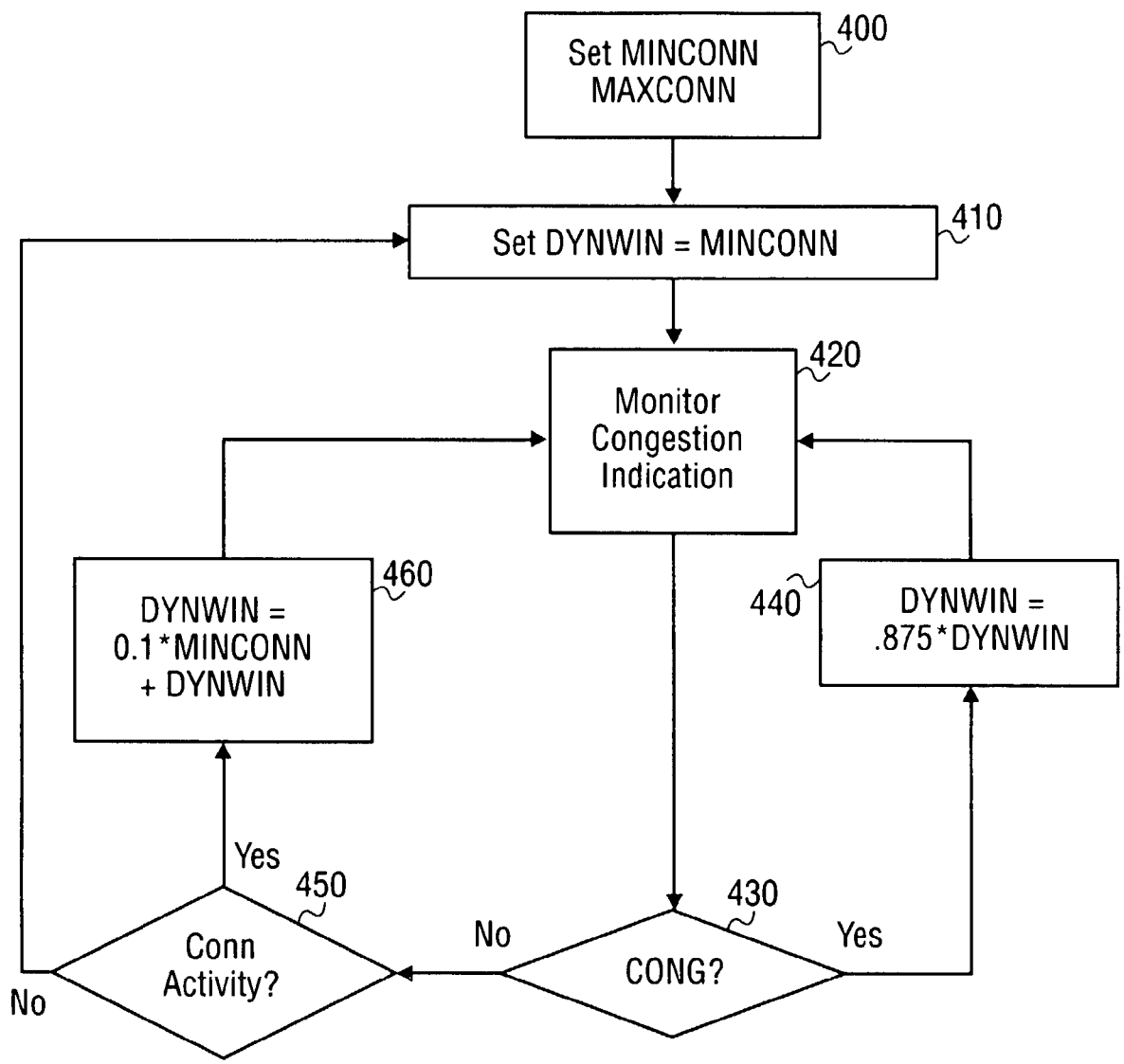

NETWORK-WIDE CONGESTION CONTROL OF SPVC SIGNALING MESSAGES

FIELD OF THE INVENTION

The field of the invention relates to networks for digital communication. More specifically, the field relates to the reduction of network-wide control message congestion.

BACKGROUND

A soft or semi-permanent virtual circuit ("SPVC") is a generic term for any communications medium that is permanently provisioned at the end points, but switched in the middle. An example of an SPVC is illustrated in FIG. 1. An SPVC through an asynchronous transfer mode ("ATM") network comprises permanent virtual circuits ("PVC") 100 at the entry 110 and exit 120. A switched virtual circuit ("SVC") 130 connects the entry 110 and exit 120. Individual switches 140 or nodes allow for different switched virtual paths ("SVP") to connect the entry 110 and the exit 120. At the entry (originator) 110 device and the exit (target) 120 device, the PVC is cross-connected to the SVC.

In a private network-network interface ("PNNI") network provisioned with primarily SPVC connections, the demand on control resources remains low until significant changes are precipitated by a failure in the network. A link or node failure may necessitate the rerouting of thousands of SPVCs. This activity results in a burst of call release, setup, route selection, and call connect activity as connections are released (de-routed) and rerouted over alternate paths, all in a relatively short period of time.

When a trunk fails at the PNNI, call clearing is initiated on both sides of the failed trunk by sequentially sending release messages for every failed connection. Once the SPVC manager 150 at the master endpoint 120 receives a release, the SPVC manager initiates a reroute of the connection by sending a setup message into the network. In an effort to conserve switch resources, the SPVC manager reacts to local node congestion, avoiding the sending of setup messages to an already congested switch.

Simulations of up to 100 node networks with failures of links carrying tens of thousands of connections provide evidence that large numbers of setup messages can be dropped at the switches at or near each end of the failed link. These drops, and the ensuing retries, significantly increase the time required for the network to recover from a failure. In these scenarios, reacting to local node congestion yields only a moderate effect on helping the SPVC manager send reroute messages into the network without causing congestion at a distant node. Although local switch congestion may be abated at the connection end nodes, evidence suggests that congestion will not be avoided in the core of the network.

SUMMARY OF THE INVENTION

Embodiments are described for a semi-permanent virtual circuit (SPVC) manager to manage a network of switches coupled together to form a semi-permanent virtual circuit. The SPVC manager considers a set of pending connections throughout the network when managing the SPVC. The SPVC manager uses either a static flow control window or a dynamically sized flow control window to manage pending connections within the network.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicate similar elements and in which:

FIG. 4 is a flowchart of a method of dynamically sizing a flow control window.

DETAILED DESCRIPTION

Figure 1:
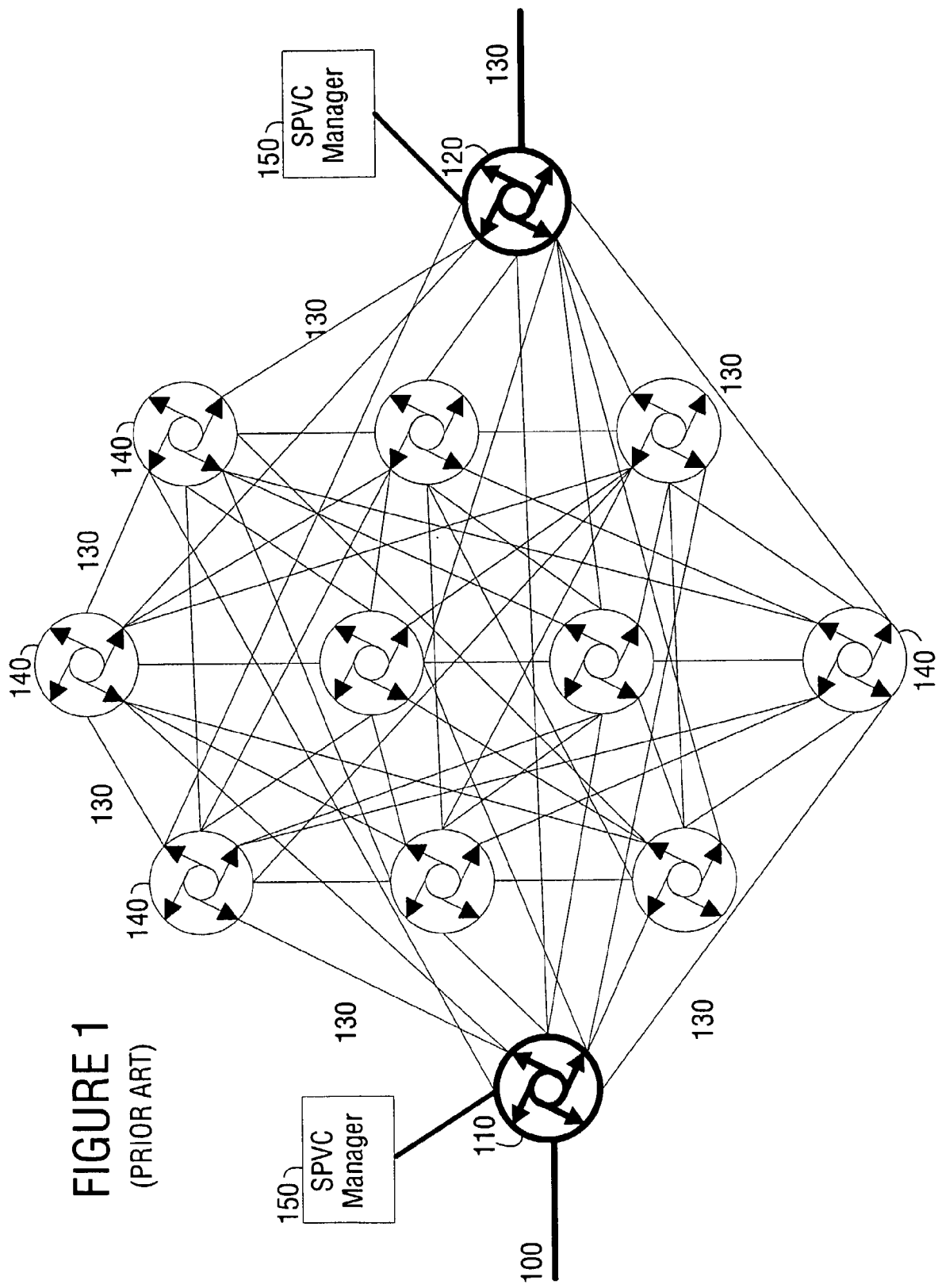
FIG. 1 is a block diagram illustrating a prior art semi-permanent virtual circuit.

A system and method are disclosed for reducing congestion within a soft or semi-permanent virtual circuit ("SPVC") by factoring in pending connections network-wide rather than simply at the local switch. Flow control windows regulate the number of connections pending in the network. The flow control windows comprise either a static window scheme based on configurable static parameters or a dynamic window-sizing scheme based on network-wide signaling congestion indications.

To avoid congestion in the core of the network, a network-wide perspective is used. The SPVC manager is designed to consider the number of connections pending in the network rather than just the number pending at the local switch.

Each switch in the network has one SPVC manager that manages all of the connections that the switch oversees as a master. The SPVC manager (200) interfaces with a call control block (CCB) (205) as illustrated by the block diagram of FIG. 2. The SPVC manager (200) initiates setup messages and is responsible for SPVC retry operations. A virtual switch interface (VSI) master (210) software module controls virtual switch interface (VSI) slaves present on the CCB (205). For one embodiment, the VSI slaves include the SPVC manager (200), an interface manager or virtual circuit manager (IFM/VCM) (215), and a connection manager or resource manager (CM/RM) (220). The IFM/VCM (215) allocates interfaces to the SPVC manager (200) and the CM/RM (220) allocates connections to the SPVC manager (200). The SPVC manager (200), when forming a connection with a specified address, requests a route from the routing agent (225) and forwards the route to the call processor (230). For one embodiment, the routing agent (225) requests a route from a private network-to-network interface (PNNI) (235). For one embodiment, the call processor (230) includes a call control (240) for processing the route provided by the route agent (225) and a signaling module (245) to interact with the service specific connection oriented protocol (SSCOP) (250). A redundancy manager (255) makes the SPVC managed by the SPVC manager (200) persistent and redundant. A call scaling module (260) scales the calls as requested by the SPVC manager (200)

Routing software monitors many points where resources may be under pressure at the switch. Congestion indicators are set when a high threshold is reached and are cleared when a low threshold is reached. These congestion indicators include (1) local node setup congestion for connections pending at the node, (2) connection resource manager mild congestion for connect and delete requests queued to the connection resource manger, and (3) connection resource manger severe congestion. The high and low congestion thresholds for these parameters are all configurable. The call control and the SPVC manager software use these congestion indicators to determine if local congestion abatement actions should be taken. The SPVC manager stops sending setup messages whenever there is any indication of local congestion.

A variety of schemes are available to determine when network-wide abatement actions are to be taken, in contrast to local congestion abatement. One method for determining network-wide abatement is a static flow control window. In this scheme, the SPVC manager 200 keeps track of the number of its connections owned by this SPVC manager that are pending anywhere in the network. The algorithm simply limits the maximum number of pending connections to the configured static window size. The optimal size of the static flow control window is based on a number of factors. These factors include the number of nodes in the network, the geographical size of the network, and the distribution across SPVC originating nodes for routing of connections across one link. The latter factor is explained as follows. If most or all of the connections are concentrated in one switch or node that has a small window, and if that switch were to go down, then rerouting would be extremely slow. Assigning a large window to the switch would help to improve flow control. Therefore, if connections are concentrated in a few nodes, then larger windows are optimal for those nodes. If connections are not concentrated in a few nodes, then smaller windows are optimal for the nodes.

A more efficient scheme uses a dynamically sized window based on network-wide congestion indications. Each switch in the network has an impending congestion monitor. The monitor maintains counters of pending connection add and delete requests. For one embodiment, the monitor's thresholds are set to one-half the resource connection manager mild congestion thresholds to act as an early warning that congestion is building. At every switch, the impending network-wide congestion status or indication is recorded in every outgoing connect message.

Figure 2:
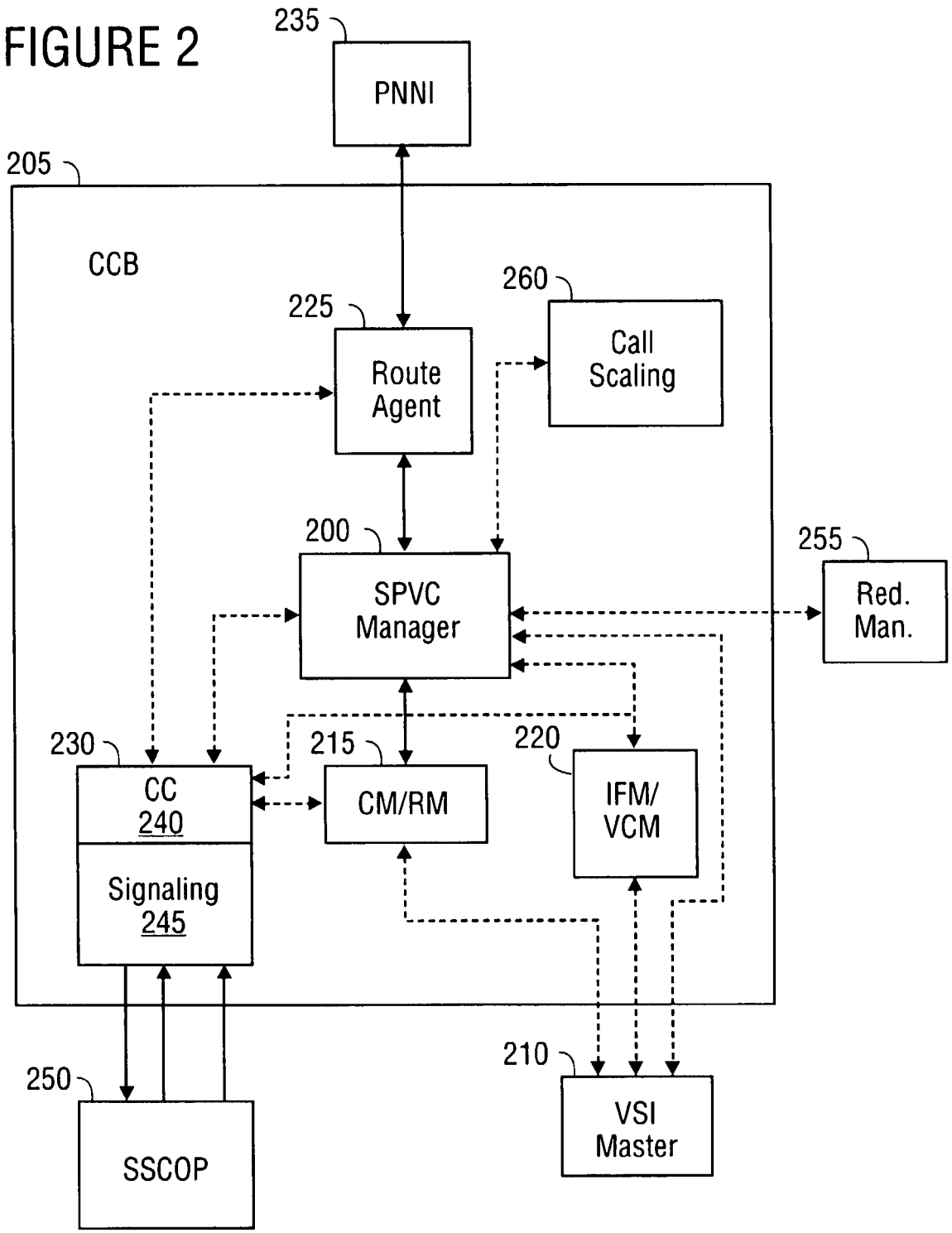
FIG. 2 is a block diagram of a semi-permanent virtual circuit manager interface.
Figure 3:
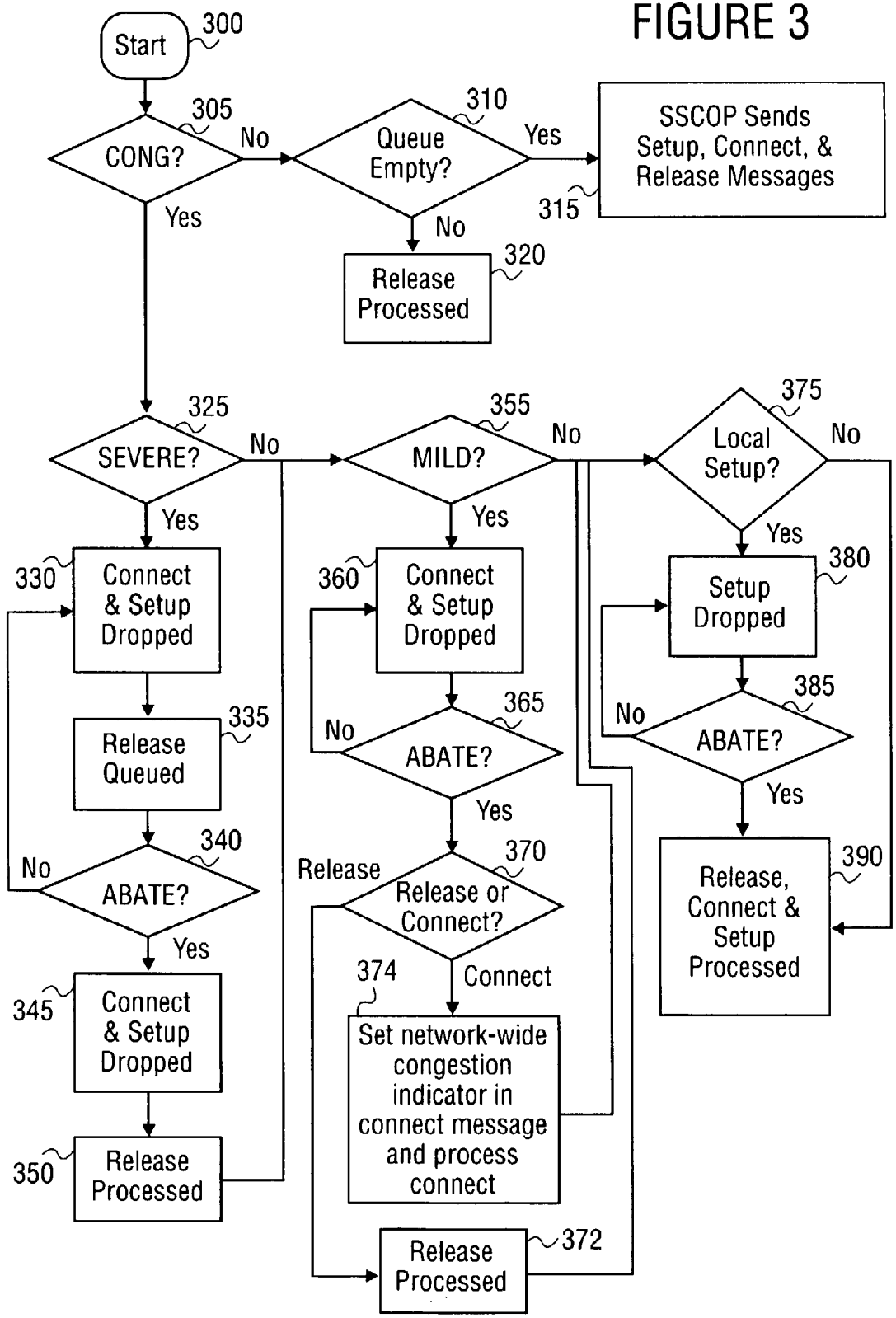
FIG. 3 is a flowchart of a method of responding to congestion.

FIG. 3 is a flowchart of the actions of the call control block 240 of FIG. 2, including the setting of a network-wide congestion indicator in a connect message. As described below with respect to FIG. 4, the SPVC manager 200 in turn monitors the network-wide congestion indicators in connection messages as part of the process of controlling the size of the congestion window. As shown in FIG. 3, if there is no congestion (Block 305) and the release queue is empty (Block 310), the SSCOP sends setup, connect, and release messages (Block 315). If the release queue is not empty (Block 310), release messages are processed (Block 320). If severe congestion is indicated (Block 325), setup and connect messages continue to be dropped (Block 330) and release messages are queued (Block 335). When severe congestion abates (Block 340), setup and connect messages continue to be dropped (Block 345). The call control processes release messages from the queue until the queue is empty and then processes any messages from SSCOP (Block 350). If mild congestion is indicated (Block 355), SSCOP drops setup and connect messages (Block 360). When mild congestion abates (Block 365), the call control block 240 processes connect and release messages from SSCOP on a first-come, first-serve basis. At block 370, a determination is made whether a message is a release message or a connect message. If the message is a release message, the release message is processed at block 372. If the message is a connect message, then at block 374 the network-wide congestion indicator or flag in the connect message is set and the connect message is processed.

If there is local node setup congestion (Block 375), SSCOP drops setup messages (Block 380). When all congestion abates (Block 385), the call control 240 processes setup, connect, and release messages on a first-come, first-serve basis (Block 390). A ten second timeout is implemented for each setup or connect message that is dropped at SSCOP.

The SPVC manager 200 monitors network-wide congestion information in connect messages that the SPVC manager 200 receives. Thus a connect message with a network-wide congestion indicator set as shown in Block 374 of FIG. 3 would be monitored by SPVC manager 200. The SPVC manager 200 thus extracts the network-wide congestion information from the connect message network-wide congestion indicator.

The SPVC manager 200 of FIG. 2 controls the size of the congestion window, as shown in the flowchart of FIG. 4. At the SPVC manager 200 the dynamic window size is configured to have a lower limit (MINCONN) and an upper limit (MAXCONN) (Block 400). For one embodiment, the lower limit is set to five pending connections and the upper limit is set to 500 pending connections. For a further embodiment, the initial window size (DYNWIN) is set to the lower limit (Block 410). The individual nodes of the network are monitored for congestion (Block 420). If the network-wide congestion indicator is set in a received connect message (Block 430), the window size is decreased by a percentage of the window size (Block 440). For one embodiment, the window size is decreased by 12.5%. If the connection is completed with no congestion indication (Block 430) and if connection activity has occurred within a specified period at the SPVC manager (Block 450), the window size is increased by a percentage of the lower threshold until the maximum window size is reached (Block 460). For one embodiment, the window size is increased by 10% of the lower threshold. If no connection activity has occurred for the specified period at the SPVC manager (Block 450), the window size is reset to the minimum threshold (Block 410). For one embodiment, the specified period is 10 seconds.

The method described above can be stored in the memory of a computer system as a set of instructions to be executed. The instructions to perform the method described above could alternatively be stored on other forms of machine-readable media, including magnetic and optical disks. For example, the method of embodiments of the present invention could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the methods as discussed above could be implemented by computer and/or machine readable media, such as discrete hardware components, large-scale integrated circuits (LSI's), application-specific integrated circuits (ASIC's), firmware such as electrically erasable programmable read-only memory (EEPROM's); and be implemented by electrical, optical, acoustical, and other forms of propagated signals (e.g., carrier waves, infrared signals, digital signals, etc.), etc.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. An apparatus, comprising:
   a semi-permanent virtual circuit (SPVC) manager to monitor a set of pending connections network-wide in order to manage an SPVC across a network of switches coupled together, the SPVC manager to manage flow control windows to regulate the set of pending connections network-wide based on the number of connections pending network-wide throughout the SPVC when managing the SPVC, wherein the flow control windows include a static flow control window to be used by the SPVC manager to manage the set of pending connections network-wide with the SPVC manager limiting the set of pending connections network-wide to be below a configured static window size.

2. The apparatus of claim 1, wherein the static window size is based on quantity of nodes.

3. The apparatus of claim 1, wherein the static window size is based on geographic size of the network.

4. The apparatus of claim 1, wherein the static window size is based on a distribution across SPVC originating nodes for routing of connections across any one link.

5. The apparatus of claim 1, further comprising a dynamic window to be used by the SPVC manager to manage the set of pending connections in the network.

6. The apparatus of claim 5, wherein a dynamic window size is based on network-wide signaling congestion indications.

7. The apparatus of claim 6, wherein the SPVC manager receives an indication of a congestion status of each switch in the network.

8. The apparatus of claim 7, wherein the indication is a congestion indicator in a connect signal.

9. The apparatus of claim 5, further including an inactivity detector to reset the dynamic window size after a period of no connection activity.

10. A method, comprising:
monitoring connection resources throughout a network of switches to develop a congestion indication; and
using the congestion indication to manage pending connections network-wide with a semi-permanent virtual circuit (SPVC) manager, wherein the SPVC manager to manage flow control windows to regulate the pending connections network-wide based on the number of connections pending network-wide throughout the SPVC when managing the SPVC, wherein the flow control windows include a static flow control window to be used by the SPVC manager to manage the set of pending connections network-wide with the SPVC manager limiting the set of pending connections network-wide to be below a configured static window size.

11. The method of claim 10, further including basing the static window size on quantity of nodes.

12. The method of claim 10, further including basing the static window size on geographic size of the SPVC.

13. The method of claim 10, further including basing the static window size on distribution across SPVC originating nodes for routing of connections across any one link.

14. The method of claim 10, further including using a dynamic window to manage the set of pending connections in the network.

15. The method of claim 14, further including basing a dynamic window size on network-wide signaling congestion indications.

16. The method of claim 15, further including monitoring a congestion level at each switch.

17. The method of claim 15, further including lowering a congestion threshold at each switch to give early warning of congestion at that switch.

18. The method of claim 15, further including receiving at the SPVC manager an indication of a congestion status of each switch in the network.

19. The method of claim 18, wherein the indication is a congestion flag imprinted in a connect signal.

20. The method of claim 14, further including detecting no connection activity on the network.

21. The method of claim 20, further including resetting the SPVC during moments of no connection activity.

22. A computer-readable storage medium tangibly embodying a sequence of instructions executable by a computer to perform a method comprising:
monitoring connection resources throughout a network of switches to develop congestion indication; and
using the congestion indication to manage pending connections network-wide with a semi-permanent virtual circuit (SPVC) manager, wherein the SPVC manager to manage flow control windows to regulate the pending connections network-wide based on the number of connections pending network-wide throughout the SPVC when managing the SPVC, wherein the flow control windows include a static flow control window to be used by the SPVC manager to manage the set of pending connections network-wide with the SPVC manager limiting the set of pending connections network-wide to be below a configured static window size.

23. The computer-readable storage medium of claim 22, further including basing the static window size on quantity of nodes.

24. The computer-readable storage medium of claim 22, further including basing the static window size on geographic size of the network.

25. The computer-readable storage medium of claim 22, further including basing the static window size on distribution across SPVC originating nodes for routing of connections across any one link.

26. The computer-readable storage medium of claim 22, further including using a dynamic window to manage the set of pending connections in the network.

27. The computer-readable storage medium of claim 26, further including basing a dynamic window size on network-wide signaling congestion indications.

28. The computer-readable storage medium of claim 27, further including monitoring a congestion level at each switch.

29. The computer-readable storage medium of claim 28, further including lowering a congestion threshold at each switch to give early warning of congestion at that switch.

30. The computer-readable storage medium of claim 28, further including receiving at the SPVC manager an indication of a congestion status of each switch in the network.

31. The computer-readable storage medium of claim 30, wherein the indication is a congestion flag imprinted in a connect signal.

32. The computer-readable storage medium of claim 30, further including setting a minimum threshold and a maximum threshold for a number of pending connections controller by the SPVC manager.

33. The computer-readable storage medium of claim 32, further including setting the dynamic window size to equal the minimum threshold.

34. The computer-readable storage medium of claim 30, further including lowering the dynamic window size upon receiving an indication of congestion.

35. The computer-readable storage medium of claim 30, further including increasing the dynamic window size upon receiving an indication of no congestion.

36. The computer-readable storage medium of claim 26, further including detecting no connection activity on the network.

37. The computer-readable storage medium of claim 26, further including resetting the SPVC during moments of no connection activity.

38. An apparatus, comprising:
- means for monitoring connection resources throughout a network of switches to develop congestion indication;
- means for using the congestion indication to manage pending connections network-wide with a semi-permanent virtual circuit (SPVC) manager, wherein the SPVC manager to manage flow control windows to regulate the pending connections network-wide based on the number of connections pending network-wide throughout the SPVC when managing the SPVC;
- means for using a dynamic window to manage the set of pending connections in the network;
- means for basing a dynamic window size on network-wide signaling congestion indications;
- means for monitoring a congestion level at each switch;
- means for receiving an indication of a congestion status of each switch in the network; and
- means for setting a minimum threshold and a maximum threshold for a number of pending connections controlled by the SPVC manager.

39. The apparatus of claim 38, further comprising means for using a static window to manage the set of pending connections in the network.

40. The apparatus of claim 39, further comprising means for limiting the set of pending connections to below a static window size.

41. The apparatus of claim 40, further comprising means for basing the static window size on quantity of nodes.

42. The apparatus of claim 40, further comprising means for basing the static window size on geographic size of the network.

43. The apparatus of claim 40, further comprising means for basing the static window size on distribution across SPVC originating nodes for routing of connections across any one link.

44. The apparatus of claim 38, further comprising means for lowering a congestion threshold at each switch to give early warning of congestion at that switch.

45. The apparatus of claim 38, wherein the indication is a congestion flag imprinted in a connect signal.

46. The apparatus of claim 38, further comprising a means for setting the dynamic window size to equal the minimum threshold.

47. The apparatus of claim 38, further comprising a means for lowering the dynamic window size upon receiving an indication of congestion.

48. The apparatus of claim 38, further comprising a means for increasing the dynamic window size upon receiving an indication of no congestion.

49. The apparatus of claim 38, further comprising a means for detecting no connection activity on the SPVC.

50. The apparatus of claim 49, further comprising a means for resetting the SPVC during moments of no connection activity.

51. A system, comprising:
- an originator switch to act as an entry device for a semi-permanent virtual circuit (SPVC);
- a target switch to act as an exit device for an SPVC;
- a network of interior switches connecting the originator switch to the target switch with a switched virtual circuit; and
- a SPVC manager to manage the SPVC, the SPVC manager to manage flow control windows to regulate a set of pending connections network-wide based on the number of connections pending network-wide throughout the SPVC when managing the SPVC;
- a dynamic window to be used by the SPVC manager to manage the set of pending connections in the network, wherein a dynamic window size is based on network-wide signaling congestion indications; and
- an impending congestion monitor coupled to each switch to monitor a congestion level at that switch, wherein the SPVC manager receives an indication of a congestion status of each switch in the network, wherein a minimum threshold and a maximum threshold are set for a number of pending connections controlled by the SPVC manager.

52. The system of claim 51, further comprising a static window to be used by the SPVC manager to manage the set of pending connections in the SPVC.

53. The system of claim 52, wherein the SPVC manager limits the set of pending connections to be below a static window size.

54. The system of claim 53, wherein the static window size is based on quantity of nodes.

55. The system of claim 53, wherein the static window size is based on geographic size of the SPVC.

56. The system of claim 53, wherein the static window size is based on a distribution across SPVC originating nodes for routing of connections across any one link.

57. The system of claim 51, wherein a congestion threshold at each switch is lowered to give early warning of congestion at that switch.

58. The system of claim 51, wherein the indication is a congestion indicator in a connect signal.

59. The system of claim 51, wherein the dynamic window size is set to equal the minimum threshold.

60. The system of claim 51, wherein the dynamic window size is lowered upon receiving an indication of congestion.

61. The system of claim 51, wherein the dynamic window size is increased upon receiving an indication of no congestion.

62. The system of claim 51, further comprising an inactivity detector to detect a period of no connection activity.

63. The system of claim 62, wherein the dynamic window size is reset after the period of no connection activity.

64. A method, comprising:
- monitoring connection resources throughout a network of switches to develop congestion indication;
- using congestion indication to manage pending connections with a semi-permanent virtual circuit (SPVC) manager;
- using a dynamic window to manage the set of pending connections in the network;
- basing a dynamic window size on network-wide signaling congestion indications;
- monitoring a congestion level at each switch;
- lowering a congestion threshold at each switch to give early warning of congestion at that switch;
- receiving at the SPVC manager an indication of a congestion status of each switch in the network;
- setting a minimum threshold and a maximum threshold for a number of pending connections controlled by the SPVC manager;
- setting the dynamic window size to equal the minimum threshold;
- lowering the dynamic window size upon receiving an indication of congestion;
- increasing the dynamic window size upon receiving an indication of no congestion;

detecting a period of no connection activity on the network; and resetting the dynamic window size after the period of no connection activity.

65. An apparatus, comprising:

a semi-permanent virtual circuit (SPVC) manager to manage an SPVC across a network of switches coupled together, the SPVC manager to manage flow control windows to regulate a set of pending connections network-wide based on the number of connections pending network-wide throughout the SPVC when managing the SPVC, wherein the SPVC manager receives an indication of a congestion status of each switch in the network, wherein a minimum threshold and a maximum threshold are set for a number of pending connections controlled by the SPVC manager; and a dynamic window to be used by the SPVC manager to manage the set of pending connections in the network, wherein a dynamic window size is based on network-wide signaling congestion indications.

66. The apparatus of claim 65, wherein the dynamic window size is set to equal the minimum threshold.

67. The apparatus of claim 65, wherein the dynamic window size is lowered upon receiving an indication of congestion.

68. The apparatus of claim 65, wherein the dynamic window size is increased upon receiving an indication of no congestion.

69. A method, comprising:

monitoring connection resources throughout a network of switches to develop a congestion indication;

using the congestion indication to manage pending connections network-wide with a semi-permanent virtual circuit (SPVC) manager, wherein the SPVC manager to manage flow control windows to regulate the pending connections network-wide based on the number of connections pending network-wide throughout the SPVC when managing the SPVC;

using a dynamic window to manage the set of pending connections in the network;

basing a dynamic window size on network-wide signaling congestion indications;

receiving at the SPVC manager an indication of a congestion status of each switch in the network; and setting a minimum threshold and a maximum threshold for a number of pending connections controlled by the SPVC manager.

70. The method of claim 69, further including setting the dynamic window size to equal the minimum threshold.

71. The method of claim 69, further including lowering the dynamic window size upon receiving an indication of congestion.

72. The method of claim 69, further including increasing the dynamic window size upon receiving an indication of no congestion.

* * * * *

UNITED STATES PATENT AND TRADEMARK OFFICE
CERTIFICATE OF CORRECTION

PATENT NO. : 7,570,584 B1  Page 1 of 1
APPLICATION NO. : 10/112452
DATED : August 4, 2009
INVENTOR(S) : Patrick D. Daley It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1215 days.

Signed and Sealed this

Seventh Day of September, 2010

David J. Kappos
*Director of the United States Patent and Trademark Office*